Figure 1:
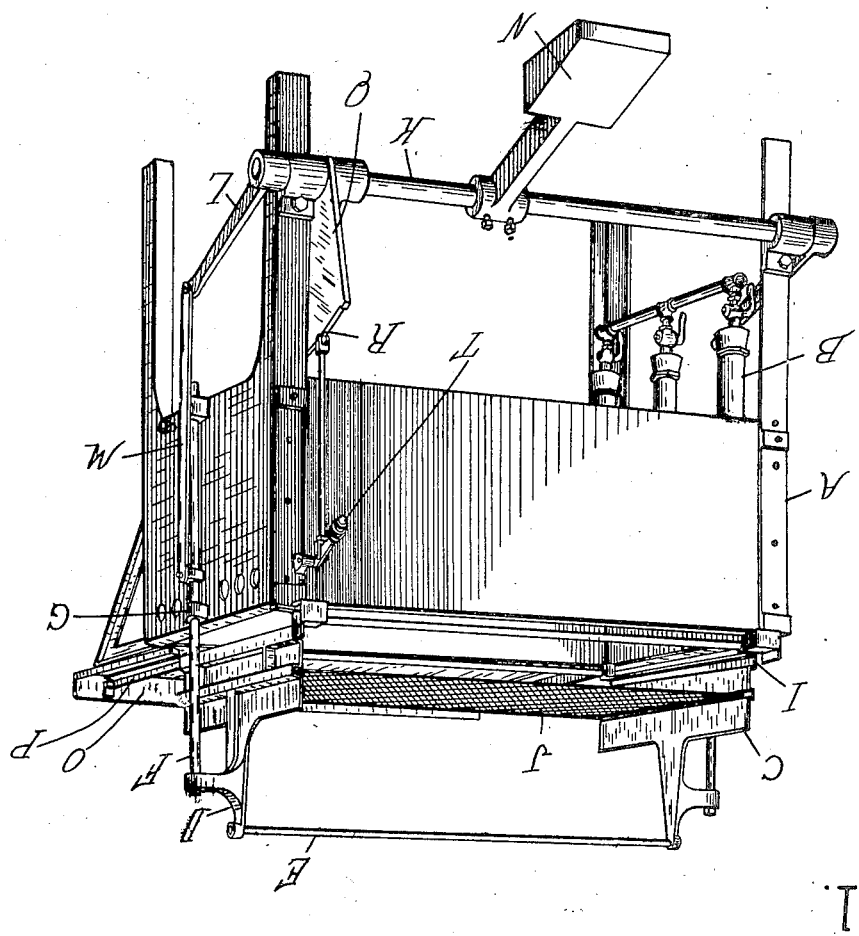

A. W. COPLAND.
FRYING MACHINE.
APPLICATION FILED APR. 21, 1910.

1,106,926.

Patented Aug. 11, 1914.
2 SHEETS—SHEET 1.

Witnesses

Inventor
Alexander W. Copland
By Williams, William Williams

A. W. COPLAND.
FRYING MACHINE.
APPLICATION FILED APR. 21, 1910.
1,106,926.
Patented Aug. 11, 1914.
2 SHEETS—SHEET 2.
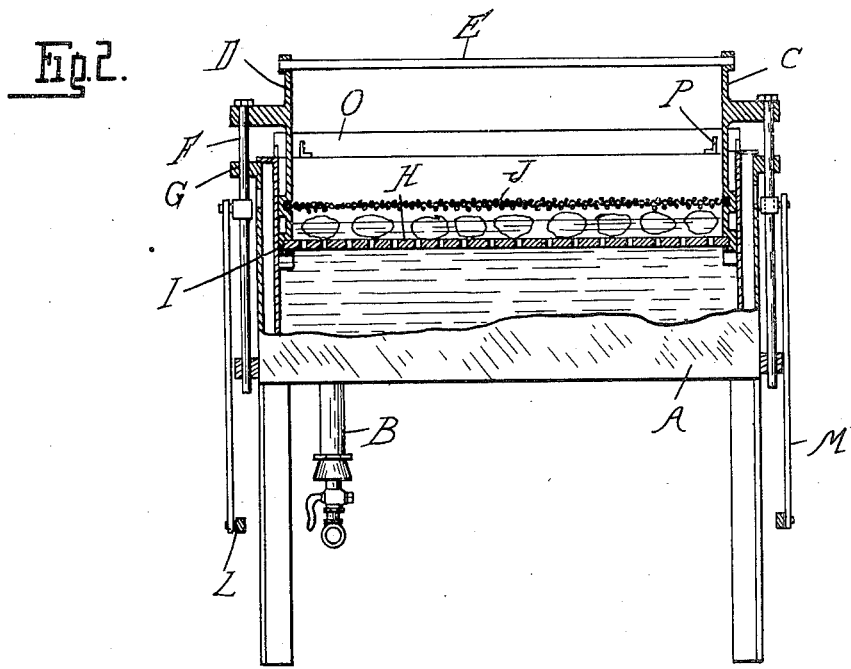
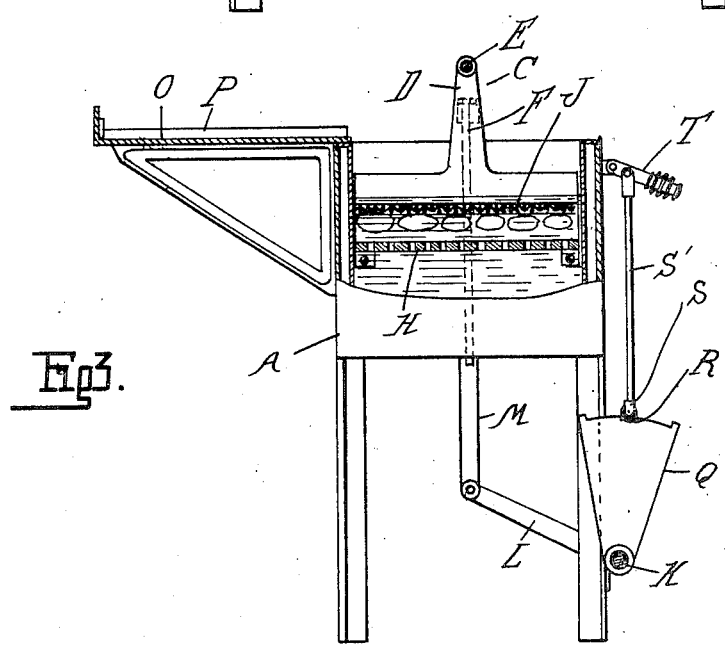
Witnesses
Inventor
Alexander. W. Copland.
By

UNITED STATES PATENT OFFICE.

ALEXANDER W. COPLAND, OF DETROIT, MICHIGAN.

FRYING-MACHINE.

1,106,926.　　　Specification of Letters Patent.　　Patented Aug. 11, 1914.

Application filed April 21, 1910. Serial No. 556,823.

*To all whom it may concern:*

Be it known that I, ALEXANDER W. COPLAND, a citizen of the United States of America, residing at Detroit, in the county of Wayne and State of Michigan, have invented certain new and useful Improvements in Frying-Machines, of which the following is a specification, reference being had therein to the accompanying drawings.

The invention relates to frying machines more particularly designed for the frying of doughnuts and other similar articles, and the invention consists in certain features of construction as hereinafter set forth.

In the drawings Figure 1 is a perspective view of the apparatus; Fig. 2 is a longitudinal section thereof; and Fig. 3 is a cross section.

A is the tank containing the fat, which is heated by suitable means, such as a gas burner B.

C is a frame adapted to be vertically reciprocated into and out of said tank, and, as shown, comprises the side members D connected by a rod E and secured to the vertical guide rods F, which slidably engage bearings G at the sides of the tank.

H are dough-carrying trays detachably engaging the frame C preferably by engaging guide grooves I in the opposite side members D thereof.

J is a perforated screen extending across the frame above the plane of the guides I and adapted to hold the dough beneath the surface of the liquid while frying.

K is a rock shaft having rock arms L thereon at opposite sides of the frame connected by links M to the vertical guides F, and N is a pedal lever for actuating the rock shaft to raise and lower the frame, said lever also constituting a counterweight for balancing the frame.

O is a rearwardly-extending frame having guides P thereon in alinement with the guides I and adapted to receive the trays after completion of the frying.

With the construction as thus far described, in use the operator places a tray filled with the dough cakes for frying in engagement with the guides I and pushes it inward into a position over the tank. The frame C is then lowered into the liquid which immerses the tray and dough cakes thereon. These cakes when first immersed are of greater specific gravity than the liquid and will sink therein, but, as soon as they become expanded by cooking, become less in specific gravity than the liquid and will rise to the surface. Thus there is danger of disarrangement of the cakes due to the floating of one over another, and this would interfere with the uniformity of the cooking and would otherwise be objectionable. I have, therefore provided means for avoiding this result, as follows: When the frame C is first lowered into the fat, its downward movement is limited to a point where the dough cakes are not deeply immersed. This position is maintained until the swelling of the cakes renders them of lesser specific gravity than the liquid, but, due to the fact that they are not deeply immersed, the cakes will not float one under the other or out of position. The frame is then depressed to a greater distance, which will cause the screen J to engage with the tops of the cakes and depress them beneath the surface of the liquid. In this operation there is no displacement of the individual cakes, and, upon the raising of the frame, all will be simultaneously seated upon the tray in the same position originally occupied. Any suitable construction of means may be employed for temporarily arresting the downward movement of the dough, but, as shown, the rock shaft K is provided with a segmental arm Q, having a notch R, therein for engaging a latch detent S, this being connected by a rod S' with an operating handle T. The notch R is so positioned that the latch engages the same, when the frame C is first depressed into the proper position for the first frying operation. After a suitable time interval the operator lifts the handle T to disengage the detent and permit the further lowering of the frame and the complete immersion of the cakes.

After the completion of the frying operation, the frame C is again raised by the depression of the lever N with the foot, and the latch R engaging a shoulder U on the segment Q will hold the parts in this position. The operator then inserts another tray having dough cakes thereon into engagement with the guides I and moves this tray inward, the tray having the fried cakes will be displaced and pushed onto the guides P from which place it may be removed. The tray of fried cakes are allowed to cool on guides P, so that the surplus fat may drip into the pan O from which it will drain directly into the tank.

What I claim as my invention is:

1. The combination with a tank, of a frame vertically adjustable into and out from said tank, a screen extending horizontally across said frame, a dough supporting tray detachably engaging guides beneath said screen, means for raising and lowering said frame, and means for temporarily arresting said frame after a partial lowering thereof permitting the further lowering of the tray.

2. The combination with a tank, of a supporting tray depressible into said tank, a superimposed screen, means for temporarily arresting the depression of said tray, and means for moving said arresting means to an inoperative position to permit of further depression of said tray.

3. The combination with a tank, of a supporting tray depressible into said tank, a superimposed screen, means for depressing said tray into the tank, means for temporarily arresting the depression of said tray, and means for moving said arresting means to an inoperative position to permit of further depression of the tray.

4. The combination with a tank, of a frame vertically adjustable into and out of said tank, a dough supporting tray detachably engaging said frame, a superimposed screen, means for temporarily arresting the depression of said tray permitting the further depression thereof.

5. The combination with a tank, of a supporting tray depressible into said tank, means for temporarily locking said tray at a predetermined point in the path of its depression, and means for disengaging said locking means to permit of further depression of the tray.

In testimony whereof I affix my signature in presence of two witnesses.

ALEXANDER W. COPLAND.

Witnesses:
  NELLIE KINSELLA,
  JAMES P. BARRY.